(12) United States Patent
Ayoub et al.

(10) Patent No.: US 11,763,387 B1
(45) Date of Patent: Sep. 19, 2023

(54) SYSTEM AND METHOD FOR THE VALUATION AND SECURITIZATION OF CONTENT

(71) Applicant: Sharematter Inc., Beaverton, OR (US)

(72) Inventors: Georges Ayoub, Vancouver (CA); Zeid Ayoub, Vancouver (CA)

(73) Assignee: Sharematter Inc., Beaverton, OR (US)

( * ) Notice: Subject to any disclaimer, the term of this patent is extended or adjusted under 35 U.S.C. 154(b) by 0 days.

(21) Appl. No.: 18/105,409

(22) Filed: Feb. 3, 2023

(51) Int. Cl.
*G06Q 40/04* (2012.01)
*G06Q 30/02* (2023.01)
*G06Q 10/04* (2023.01)
*G06F 16/28* (2019.01)

(52) U.S. Cl.
CPC .......... *G06Q 40/04* (2013.01); *G06F 16/285* (2019.01); *G06Q 10/04* (2013.01); *G06Q 30/0278* (2013.01)

(58) Field of Classification Search
CPC .... G06Q 40/04; G06Q 10/04; G06Q 30/0278; G06F 16/285
See application file for complete search history.

(56) References Cited

U.S. PATENT DOCUMENTS

| 7,529,684 | B2 | 5/2009 | Elliott |
| 7,668,770 | B2 | 2/2010 | Elliott |
| 10,395,253 | B2 | 8/2019 | Hessler |
| 10,878,500 | B2 | 12/2020 | Al-Masoud |
| 10,915,924 | B1 | 2/2021 | Soloff |
| 2003/0225653 | A1* | 12/2003 | Pullman ............... G06Q 50/184 705/310 |
| 2006/0095322 | A1* | 5/2006 | Dierks ................... G06Q 30/02 705/14.46 |
| 2007/0106551 | A1 | 5/2007 | McGucken |
| 2007/0244828 | A1 | 10/2007 | Shahbodaghi |

(Continued)

FOREIGN PATENT DOCUMENTS

| EP | 2112605 A1 * | 10/2009 | ....... G06F 17/30038 |
| WO | WO-0239717 A2 * | 5/2002 | ............. G06Q 30/06 |

OTHER PUBLICATIONS

Millikan, Nic: Misic Royalties are King in the Search for Yield, Feb. 16, 2022, CAIA Association, pp. 1-5 (Year: 2022).*

(Continued)

*Primary Examiner* — Bijendra K Shrestha
(74) *Attorney, Agent, or Firm* — Charles B. Lobsenz; Brian H. Buck; Potomac Law Group, PLLC (57) ABSTRACT

The system and methodology of the present invention operate, in one embodiment, to provide a set of cloud-based applications through which creators, initial investors and secondary investors can all interact so that content catalogs can be valued, initially invested in and traded on a secondary basis. As a result, content creators can source valuable capital for growth and expansion as well as other purposes. Separately, the system and methodologies of the present invention provide the unique opportunity for investors to invest in an interesting asset class which is diverse from other typical investment vehicles. The ability to rely on automated valuations at the time of the initial offering as well as the liquidity provided via secondary trading enhances the desirability of the content catalog asset class as well as the revenue streams associated therewith.

6 Claims, 6 Drawing Sheets

(56) References Cited

U.S. PATENT DOCUMENTS

| | | |
|---|---|---|
| 2009/0216619 A1 | 8/2009 | Tavernier |
| 2013/0204664 A1* | 8/2013 | Romagnolo ....... G06Q 30/0203 |
| | | 705/7.32 |
| 2017/0206604 A1 | 7/2017 | Al-Masoud |
| 2020/0013129 A1 | 1/2020 | Pullman |
| 2021/0049627 A1 | 2/2021 | Romagnolo et al. |

OTHER PUBLICATIONS

Wolff-Mann, Ethan: Bowie Bonds: How David Bowie Securitized His Royalties and Oredicted the Future, Jan. 11, 2016, Money, pp. 1-5. (Year: 2016).*

KBRA: Hipgnosis Music Assets 2022-1 L.P., Aug. 2, 2022 pp. 1-15. (Year: 2022).*

Bocconi Students Investment Club (BSIC): Private Eqyity and The Musiv Industry: An Unlikely Love Story, Nov. 2020, pp. 1-7 (Year: 2020).*

\* cited by examiner

FIG. 1

Back Catalog Valuation Example
*(Tables)*

700

| Retrieved Data | Video A | Video B | Video C | Total |
|---|---|---|---|---|
| Posted Date | Dec 1 2022 | Jun 1 2022 | Jan 1 2022 | |
| Total Views | 1,000,000 | 1,500,000 | 1,750,000 | 4,250,000 |
| Views in Last 360 Days | 1,000,000 | 1,500,000 | 1,750,000 | 4,250,000 |
| Views in Last 30 Days | 1,000,000 | 150,000 | 50,000 | 1,200,000 |
| Total Revenue | $ 12,000 | $ 15,000 | $ 20,000 | $ 47,000 |
| Revenue in Last 360 Days | $ 12,000 | $ 15,000 | $ 20,000 | $ 47,000 |
| Revenue in Last 30 Days | $ 12,000 | $ 1,500 | $ 500 | $ 14,000 |
| Category | Cooking | Cooking | Cooking | |
| Subscribers | | | | 250,000 |

702

| Retrieved Data | Video A | Video B | Video C | |
|---|---|---|---|---|
| Title | French Fries | Lamb Chops | Stir Fry | |
| Total Comments | 100,000 | 120,000 | 110,000 | |
| Total Likes/Dislikes | 1000/500 | 3000/100 | 1700/1000 | |
| URL | https://youtube.com/vHysd | https://youtube.com/sgYYx | https://youtube.com/aHryT | |

704

| | 30+ Days Old | 60+ Days Old | 360+ Days Old |
|---|---|---|---|
| Content Monthly Views | 1,000,000 | 150,000 | 50,000 |
| Average Monthly Revenue | $12,000 | $1,500 | $500 |
| Views Proportion of Total | 83% | 12.5% | 4.5% |

705

| | |
|---|---|
| Growth Rate | 5% |
| Decay Rate | 1% |
| Discount Rate | 5% |
| Risk Free Rate | 5% |

706

| | Expected Total Views | Revenue per View | Total Revenue | Discounted Value | Discounted by Time Value |
|---|---|---|---|---|---|
| Month 1 | 300,000 | $ 0.011 | $ 3,300.00 | $ 2,970.00 | $ 2,970.00 |
| Month 2 | 225,500 | $ 0.011 | $ 2,480.50 | $ 2,232.45 | $ 2,220.00 |
| Month 60 | 183,000 | $ 0.011 | $ 2,013.00 | $ 1,811.70 | $ 1,111.00 |

SYSTEM AND METHOD FOR THE VALUATION AND SECURITIZATION OF CONTENT

FIELD OF THE INVENTION

The present invention is directed generally to systems and methodologies associated with the monetization of content and more particularly to systems and methodologies which provide for the valuation and securitization of revenue streams associated with such content.

BACKGROUND OF THE INVENTION

With the advent and wide availability of Internet-based platforms for implementing business processes, a number of unique and interesting business models have emerged. Prior to the availability of these platforms and the technology used to implement them, there were many more barriers to entry for new business models than there are today. These barriers included the lack of off the shelf technological solutions for implementing new and unique business processes. As a result, in the past, much higher capital investments, time commitments and general level of effort was required to implement business models which materially diverged from what was already available. In many cases, large budgets for bespoke software development efforts were required in order to achieve the desired goals when seeking to implement a new methodology or process for conducting business.

Now that various robust and flexible solutions exist for implementing new online business models without major coding efforts, entrepreneurs are driven to innovate and also have the flexibility to drive new solutions and open up new markets in industries that had previously been constrained in terms of growth opportunities.

One particular area in which these recently available platforms have generated significant growth is content development and monetization. Platforms such as YouTube, TikTok, Instagram and others have flourished in that they essentially allow anyone to develop and monetize content. As a result of being relatively easy to get started and easy to use, many creative individuals have developed content in one or more niches of interest to them and monetized that content through one of the platforms such as those listed above. While the creation of significant revenue streams based on original content is far from guaranteed, the opportunity is present given desirable content and a reasonable amount of marketing expertise.

There exist a set of content creators, often labeled as "influencers" or a similar term, who have developed their own brand and a large reach in terms of dedicated and interested viewers. Some of these influencers can achieve revenue streams at or in excess of seven figures per year based upon their content and the monetization thereof. Revenue streams are typically primarily derived from advertising revenue which is sourced by and split with the operator of the content platform. In addition, other sources of revenue derived from content include sponsorships, licensing deals and event related activities. Much if not all of these activities can be and are managed by platforms specifically designed for the monetization of content regardless of the type of content, geographic location of the creator, or other unique aspects associated with the content or the creator.

While many creators have built businesses built on content monetization from the ground up, others have required and relied upon the availability of significant capital to get started and/or to scale up to better produced content and larger audiences. Capital is often required for production, travel, advertising, marketing and other expenses associated with producing and marketing quality content such that a large number of viewers are desirous of consuming the content and thus larger advertising revenues can be generated and shared between the creator and the platform.

By way of analogy to the movie industry, most "blockbuster" movies have significant risk capital behind them before production begins. While this is the accepted practice in that industry, it is not ideal in respect of individual, but yet talented and creative creators seeking to develop and monetize content for consumption on internet-based platforms.

While there have been some proposed solutions which allow creators to source capital in consideration of a share of revenue streams associated with their content, these solutions suffer from a number of drawbacks which are addressed by the present invention.

SUMMARY OF THE INVENTION

A primary objective of the invention disclosed herein is a system and methodology which addresses the drawbacks of the prior art by employing novel processes and implementations in order to provide a platform through which content creators can source capital in return for a share of revenue streams associated with either or both of their current catalog of content and/or future (to be produced) content. The system of the present invention implements machine learning techniques in support of an automated valuation determination for both existing and future content catalogs. This, in turn, enables efficient decision-making in terms of the potential offering of content catalogs as well as potential investments therein.

In some embodiments of the system of the present invention, a valuation engine is included. The valuation engine develops automated valuations of back catalog content groupings/using collected data such as views, subscribers, past revenue associated with the catalog. This data is used in connection with other available data which is not specific to the particular back catalog under consideration. Cash flow projections for the back catalog are developed based on these processes and an estimated valuation of the catalog is then generated. The valuation can then be used in connection with an offering of the catalog to qualified investors.

In some embodiments of the present invention, a valuation engine for valuing potential future content groupings may be included. Systems and processes are included in this context so as to provide for the generation of an estimated valuation for content to be produced by a content creator in the future. Again, machine learning techniques are applied so as to assess potential revenue streams associated with content expected to be produced by a content creator in the future and which such content meets defined characteristics. In these embodiments, known data associated with content previously produced by a creator is collected and used as well as other metrics such as posting frequency, previously generated revenue streams and content view data. This data is processed in connection with other data which is not specific to the creator or the expected future content in order to arrive at an estimated valuation for future content to be produced by the creator and falling within the bounds of pre-determined criteria.

Various embodiments of the present invention provide for a platform through which content offerings (back catalog and/or future content to be produced) associated with a creator or set of creators may be made. In this case, initial pricing of the offering is based on the valuations determined via the automated processes described above. Qualified and registered investors may then elect to invest in the content catalogs, and more specifically the future revenue streams associated therewith, at the valuations determined by the system of the present invention.

The system and method of the present invention, in some embodiments, may provide for and control the offering process including enabling content creators to elect to move forward or not move forward with the offering based upon the valuations proposed for the offering. In addition, the present invention, in some embodiments, provides the ability for the offering process to be automated including soliciting investment commitments and attempting to fill the full allotment of shares available with respect to the offering. In some cases, the system may implement algorithms which allow for prioritization of commitments based on various factors such as level of commitment, time of commitment, investor status and/or other metrics.

Yet another aspect of the system of the present invention is its ability, in some embodiments, for it to enable and control a process for secondary trading of interests in content catalogs (back catalog and/or future content to be produced). In this case, investors (both initial investors and others), once qualified and registered, can freely trade shares in the content catalogs following the initial securitization. Trading in this manner provides valuable liquidity and broad access to portions of the revenue streams derived from the content catalogs.

In some embodiments of the present invention, the provided valuation engine employs data obtained from previous initial content offerings and later transactions associated with the trading of the same or similar content catalogs in order to enhance valuation accuracy for both existing and future catalogs Another novel aspect of the present invention is a system and methodology for implementing a sunset fund associated with content assets and the securitization thereof. In a preferred embodiment of this implementation, funds derived from fees associated with secondary trading in content catalog shares are allocated to a sunset fund. A portion of that fund may be shared with creators and/or the operator of the platform. With respect to the remaining funds, those may be retained and paid out to investors in content catalogs at the time that the revenue streams associated with the content catalogs cease.

The system and methodology of the present invention operate, in one embodiment, to provide a set of cloud-based applications through which creators, initial investors and secondary investors can all interact so that content catalogs can be valued, initially invested in and traded on a secondary basis. As a result, content creators can source valuable capital for growth and expansion as well as other purposes. Separately, the system and methodologies of the present invention provide the unique opportunity for investors to invest in an interesting asset class which is diverse from other typical investment vehicles. The ability to rely on automated valuations at the time of the initial offering as well as the liquidity provided via secondary trading enhances the desirability of the content catalog asset class as well as the revenue streams associated therewith.

DETAILED DESCRIPTION OF THE INVENTION

The present disclosure will now be described in terms of various exemplary embodiments. This specification discloses one or more embodiments that incorporate features of the present embodiments. The embodiment(s) described, and references in the specification to "one embodiment"; "an embodiment", "an example embodiment", etc., indicate that the embodiment(s) described may include a particular feature, structure or characteristic. Such phrases are not necessarily referring to the same embodiment. The skilled artisan will appreciate that a particular feature, structure or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements; are merely provided to assist in a comprehensive understanding of the present embodiments. Thus, the present embodiments can be carried out in a variety of ways and do not require any of the specific features described herein. Also, well-known functions or constructions are not described in detail since they would obscure the present embodiments with unnecessary detail.

The description is not to be taken in a limiting sense but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions herein should be understood to control over dictionary definitions, definitions in documents incorporated by reference, and/or ordinary meanings of the defined terms.

The indefinite articles "a" and "an," as used herein and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term or as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Figure 1:
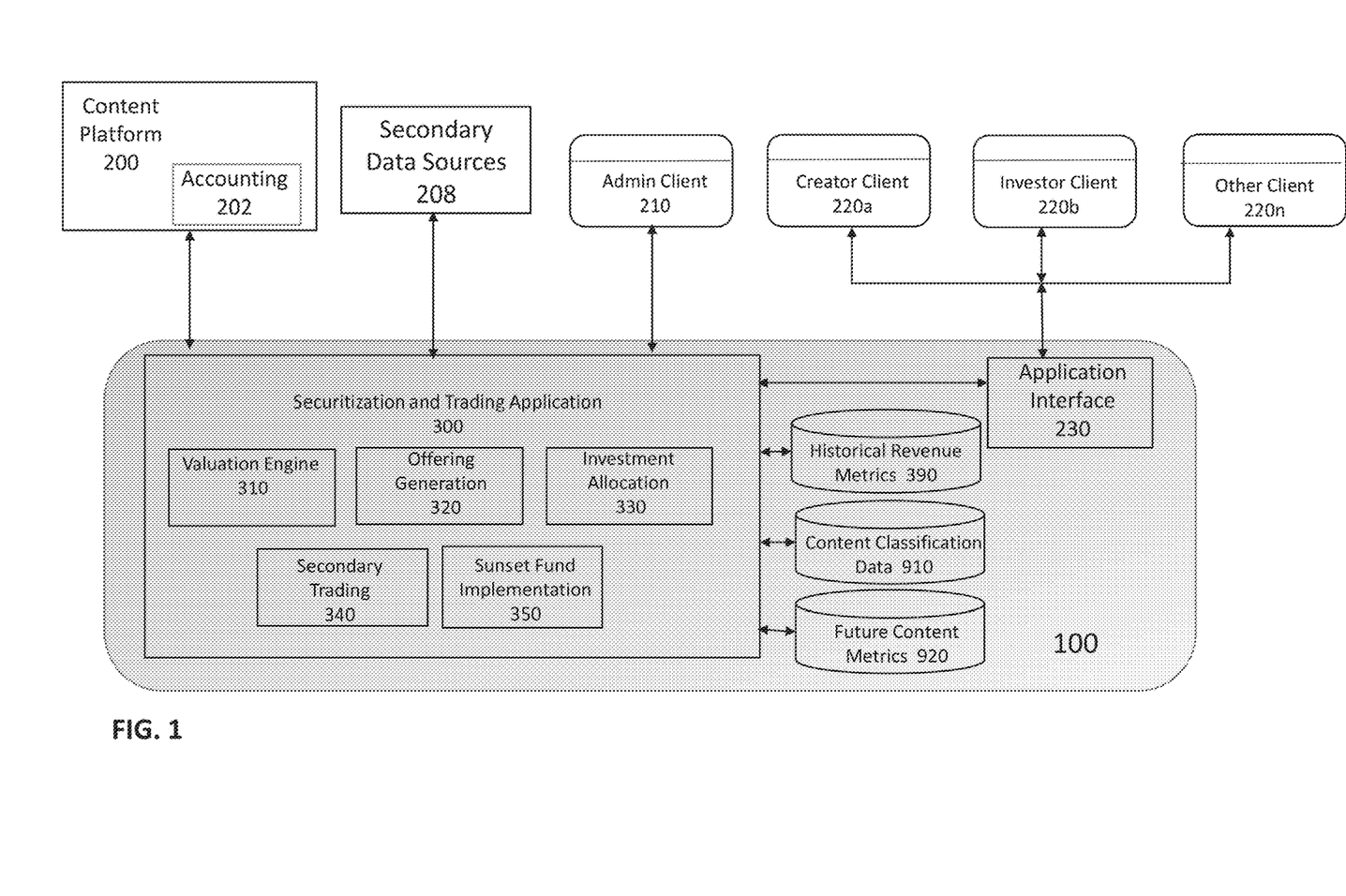
FIG. 1 is a diagram depicting the major components of the system of the present invention, including various elements with which the system of the present invention may interact, in preferred embodiments thereof.

With reference now to FIG. 1, the system of the present invention, in one preferred embodiment thereof, is now described. According to this preferred embodiment, a content catalog offering and trading system 100 is provided which allows content creators to sell portions or all of their content catalogs and the revenue streams associated therewith to investors. The sale may be permanent or it may be only for a period of time after which the content and the revenue streams revert back to the creator. In addition to the initial sale to investors, the system 100 of the present invention allows for secondary trading of shares of the securitized content catalog. One unique feature of the present invention is the automated valuation of content catalogs which can take place prior to the initial offering of shares and/or sometime thereafter in connection with secondary trading of the assets. The valuation methodologies of the present invention provide additional confidence to both content creators and investors that the pricing for the content catalogs are fair and equitable. This, in turn, attracts more investors and creators to a service which is implemented by the trading system 100 of the present invention.

In preferred embodiments, content catalog offering and trading system 100 includes Securitization and Trading Application (SATA) 300. SATA 300 may reside on a single cloud-based server, although it is also possible for various components of SATA 300 (as described herein) to reside on separate servers. By way of example, SATA 300 may be a computer-implemented application which resides on a computing server.

SATA 300 preferably includes valuation engine (VE) 310. VE 310 operates to generate valuations of content catalogs. These content catalogs may be existing catalogs of content or content to be developed by a creator in the future or some combination of both. In preferred implementations, bounds regarding the scope of content included within the catalogs is clearly defined as more fully set forth below. Valuations are based primarily on cash flows expected to be generated by the catalogs and data sourced from external sources. In preferred embodiments, machine learning techniques are applied to generate additional data which is stored by content catalog offering and trading system 100 and which is used to enhance the accuracy of the valuations undertaken. These valuations may be used in connection with an initial offering for investment into these catalogs and/or in connection with secondary trading of these assets. Valuations and their usage in connection with the securitization, offering and trading of content catalogs in accordance with the teachings of the present invention is discussed in further detail below.

System 100 also interacts with and is in communication with one or more clients 210, 220a, 220b, . . . 220n. System 100 may be accessed through the Internet, or any other private or public network, by one or more of clients 210 and 220. Each of clients 210 and 220 may be personal computers, laptops, handheld computing devices (such as smartphones or tablets) or any other device capable of providing the required connectivity and display. In some embodiments, clients 210 and 220 may be a computing application operated by a customer which requires interaction with system 100 for one or more of the purposes discussed herein.

Admin client 210 functions to allow users to configure, maintain and support the operation of system 100. For example, a user may use admin client 210 to interact with system 100 to initiate an offering of a content catalog, set parameters for secondary trading of securitized content catalog shares, communicate with investors and creators, set parameters associated with catalog valuations, initiate catalog valuations and many other types of interactions. In most cases admin client 210 will be password protected and accessible only by employees and agents of the entity that manages the valuation, securitization and trading of content catalogs using system 100 as generally described herein.

Client 220a may be used by a content creator and/or their agent to communicate with system 100. As will be discussed in more detail, there are many interactions which may occur between a content creator and system 100 including, for example, the submission of a catalog for valuation and/or initial offering to investors, activities in connection with secondary trading of shares in the content catalog, accessing and providing information associated with investors and investments in all of content creator's catalogs as well as many others. Client 220a may host one or more client based applications for carrying out the above mentioned activities or the functionality may be entirely cloud based and resident within system 100.

Client 220b may be used by an investor and/or his or her agent to communicate with system 100. As will be discussed in more detail, there are many interactions which may occur between an investor and system 100 including, for example, committing to investments in initial offerings of content catalogs, accessing related account information, secondary trading of shares in content catalogs as well as many others. Content creators, investors, administrators and other users that desire to interact with system 100 may do so through other client platforms 220n such that many different users of many different types may interact with system 100 simultaneously and from different physical locations.

Interaction between clients 210 and 220 on the one hand, and system 100 on the other hand, is managed by and under the control of application interface 230. Application interface 120 may comprise one or more application programming interfaces (APIs) that permit applications associated with clients 210 and 220 to communicate with system 100.

Secondary data sources 208 may also be present according to the teachings of the present invention. Secondary data sources 208 may comprise one or more external databases, data sets, systems, applications, rules bases and/or other sources of data which are used by system 100 to value, securitize and permit the trading of content catalogs as further described herein. By way of example, secondary data sources 208 may comprise datasets reflecting third party valuations of content types/catalogs and/or revenue streams associated therewith as well as other sources of data useful to system 100 in valuing content catalogs and related revenue streams as described more fully herein.

Returning now to the specific components of system 100, system 100 may include various components for valuing, securitizing and permitting the trading of content catalogs as more fully disclosed herein. In one embodiment of the present invention, the components comprising system 100 may include application interface 230 (described above), historical revenue metrics database 390, content classification database 910, future content metrics 920 and the various components of Securitization and Trading Application (SATA) 300. Each of these components and their associated functionality are more fully described below.

System 100 may reside on one or more physical servers. These servers may include electronic storage, one or more processors, and/or other components. The servers may also include communication lines or ports to enable the exchange of information with a network and/or other computing platforms. The servers may include a plurality of hardware, software and/or firmware components operating together to provide the functionality attributed herein to system 100.

Electronic storage associated with the servers may comprise non-transitory storage media that electronically stores information. The electronic storage media of electronic storage may include system storage that is provided integrally (i.e., substantially non-removable) with servers and/or removable storage that is removably connectable to the servers via, for example, a port or drive.

Electronic storage may include one or more of optically readable storage media (e.g., optical disks, etc), magnetically readable storage media (e.g., magnetic tape, magnetic hard drive, floppy drive, etc.), electrical-charge-based storage media (e.g., EEPROM, RAM, etc.), solid-state storage media (e.g., flash drive, etc.) and/or other electronically readable storage media. Electronic storage may include one or more virtual storage resources (e.g., cloud storage, a virtual private network and/or other virtual storage resources). Electronic storage may store software algorithms, information determined by processors, information received from servers, information received from clients 220 and/or other information that enables the servers to function as described herein.

While an exemplary architecture is described above, it will readily be understood by one of skill in the art that an unlimited number of architectures and computing environments are possible while still remaining within the scope and spirit of the present invention.

Returning now to the specific components of system 100 shown in FIG. 1, SATA 300 includes various modules which are now generally described. The operation of each of these modules will be described in further detail below. In a preferred embodiment of the present invention, valuation engine 310 automatically provides valuations for content catalogs to be considered for securitization according to the teachings of the present invention. Valuations are used as part of the overall process for developing and initiating initial offerings of content catalogs (and the revenue streams associated therewith). There are many benefits to increased accuracy in terms of valuation not the least of which is generating additional investor interest due to perceived and actual equity in making such investments. One unique aspect of the system and methodologies of the present invention is the application of machine learning techniques to iteratively and successively enhance valuation accuracy based upon learnings from previous valuations.

As described in more detail below, valuation engine 310 may access data in historical revenue metrics database 390 to enhance valuation accuracy. In preferred embodiments, historical revenue metrics database 390 includes information which reflects actual revenue derived from previously valued and/or traded content catalogs. In this way, as system 100 processes more and more valuations and also has access to actual revenue derived from catalogs which are securitized via system 100, adjustments to valuation parameters can be made to enhance valuation accuracy. The revenue data available in historical revenue metrics database 390 may apply to back catalogs (already existing content) or future content catalogs (to be produced content defined as within certain parameters), or both. As such, the data stored in historical revenue metrics database 390 can be used to enhance valuations of both back catalogs and future content catalogs.

Valuation engine 310 may also access data contained in content classification data database 910. This database 910 preferably includes data reflecting types and categories of content that may exist within catalogs as well as parameters that apply to each of these types such as expected revenue parameters, growth/decay rates typically applicable to each content category as well as others. Again, the availability of this type of data, and the ability to leverage this type of data in connection with the processes for determining valuations as more fully described below, enhances accuracy of valuations and, in turn, increases investor interest and trust.

Future content metrics database 920 may also be included within system 100 in preferred embodiments of the present invention. This database includes data which is used by valuation engine 310 in connection with the valuation of future content catalogs and may include growth/decay rates typically associated with categories of content expected to be provided by a creator in the future. Additional data and parameters which can be associated with content types and categories include information such as expected view and/or expected subscribers for various types of content categories which are likely to be produced by content creators in the future.

SATA 300 further preferably comprises offering generation module 320. This module manages and controls the steps in the process for developing and initiating initial offerings of content catalogs to investors. This may include presentation of valuations to investors, solicitations of interest, managing the execution of required documents and other activities associated with the initial offering of content catalogs according to the teachings of the present invention in preferred embodiments thereof. Operating in close connection with offering generation module 320, investment allocation module 330 manages the process of allocating shares of securitized content catalogs to investors that have expressed interest. Various algorithms can be implemented to fairly allocate shares and/or allocate shares based on priorities determined by the operator of system 100.

Secondary trading module 340 manages and controls the process for secondary trading of shares of securitized content catalogs on system 100. Following the initial offering of a content catalog, owners of shares in that catalog and other buyers and sellers may elect to buy and sell shares of content catalogs as managed by secondary trading module 340. Updated valuations for catalogs may be invoked and generated according to the teachings of the present invention. These updated valuations may be made available to some or all investors using system 100 to guide purchase and sale decisions and as specific content catalog valuations change over time in light of influences such as increased or diminished revenue streams generated by these content catalogs.

Sunset fund implementation module 350 manages and controls the operation and implementation of a sunset fund which may be offered by the operator of system 100. As will be described in more detail below, this sunset fund allows for a portion of trading fees to be set aside and distributed in various ways to various parties at different time intervals for the purpose of enhancing the trading experience and incentivizing investors and content creators as preferred by the operator of system 100.

Content platform 200 is in communication with system 100 and in particular, SATA 300. Content platform 200 is typically a third party platform for the hosting and consumption of content wherein that content can be monetized by creators though streams such as shares of advertising revenue, sponsorships, shares of subscription revenue and other revenue streams. Example of these third party platforms include YouTube, TikTok, Instagram and others. In a preferred embodiment, various application programming interfaces (APIs) exist such that SATA 300 and the various content platforms 200 can efficiently communication data back and forth as required to implement the operations of system 100 as described herein. Content platform 200 preferably includes an accounting module 202 through which system 100 can obtain various information regarding content catalogs available on content platform 200 in support of valuations undertaken by valuation engine 310 in accordance with the teachings of the present invention.

Figure 2:
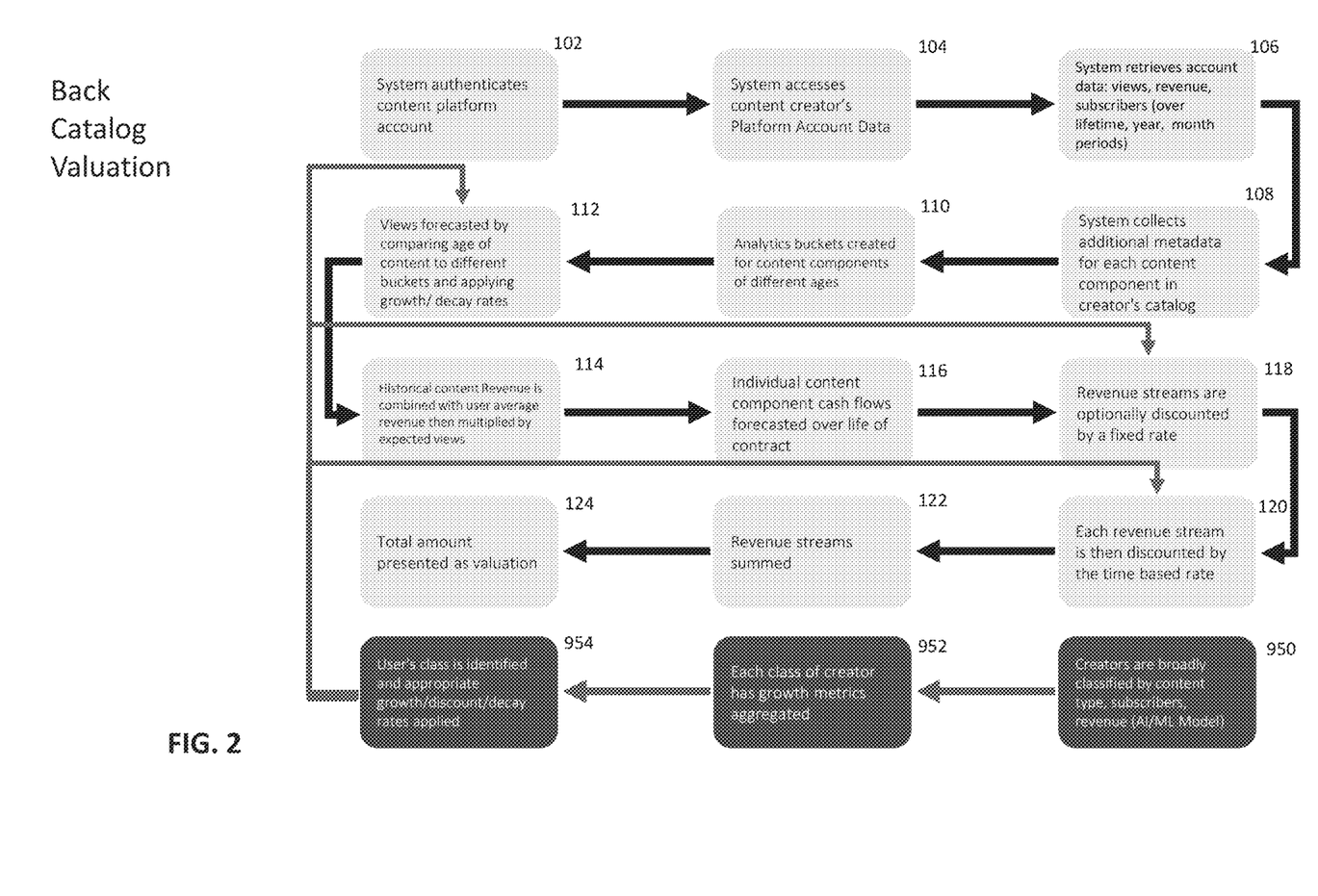
FIG. 2 is a process flow diagram illustrating the process for automatic back-catalog content valuation in one embodiment of the present invention.

Turning now to FIG. 2, a flowchart describing the steps in the process of generating a valuation of a back catalog content catalog according to the teachings of the present invention, is provided. This process may be invoked at any time a valuation of a back catalog content catalog is desired or required. For example, it may be invoked in connection with the overall process required to initiate an initial offering of one or more back catalogs. Alternatively, it may be invoked later, in connection with secondary trading of a securitized catalog. In either case, the novel valuation methodology of the present invention provides unique advantages in support of investing and trading of content catalog revenue streams.

The process of obtaining an automated valuation begins at step 102 wherein valuation engine 310 of system 100 authenticates a content creator's account information on content platform 200 via accounting module 202. This is preferably achieved as a result of communication between system 100 and content platform 200 using available APIs. In preferred embodiments, a content creator will provide required account information associated with the account holding the content catalog as well as all authorization information such as required passwords such that a protocol is established wherein valuation engine 310 can query content platform 200 for data required in connection with later steps in the process.

While this process is discussed in the context of a content creator account and one or more content catalogs associated with that content creator on the specific content platform 200, other alternatives are possible. For example, the process can take place with respect to a single content catalog associated with an account or a single account holding content from various content creators. There exist many different possibilities with the only requirement being that there is account information associated with one or more pieces of content available on content platform 200.

At step 104, system 100, now that it has been authorized by content platform 200, accesses platform account data resident on content platform 200 and associated with the account which has been authorized. This data may include, as referenced in step 106, for example, number of views for a specific grouping of content, revenue generated from a specific grouping of content, number of subscribers to a specific grouping of content over a lifetime (or some specified time period such as the last year, last month etc.) as well as other data which is useful in generating a valuation for a content catalog according to the teachings of the present invention in a preferred embodiment thereof.

At step 108, data for each content component in the catalog is retrieved until data is obtained for all content components in the specific grouping of content (i.e. the catalog). At step 110, analytics buckets are created for the various content components of different ages in the content catalog. It is assumed that the viewership of content follows a semi-predictable lifecycle over its lifetime. For example, assume the following:

1. Video posted on Jan 1
2. By Jan 31, the video has accrued 100,000 total views (net new 100,000 Views in Jan)
3. By Feb 28, the video has accrued 150,000 total views (net new 50,000 Views in Feb)
4. By March 31, the video has accrued 175,000 total views (net new 25,000 Views in March)
5. By December 31, the video has accrued 265,000 total views (net new 10,000 views per month)

It is assumed that each creator is associated with a unique curve that aligns with the type of content and the quality of content that the creator produces as well as the engagement of that creator's viewers. To generate a curve for a given creator:

1. System 100 retrieves the number of views and total revenue of creator's individual videos for 3 time periods—30 days, 12 months, and lifetime.
2. System 100 then classifies each video by its age and places it into the appropriate age bucket (e.g. Less than 30 days old, 30-60 days old, 60-90 days old etc.)
3. Statistics are then generated for each bucket (e.g. Videos less than 30 days old have an average of 100,000 views and $1,000 of revenue while videos 30-60 days old have an average of 150,000 views and $1,500 of revenue)
4. Each bucket's statistics are then compared to the totals for the creator (eg. On average, views in the first 30 days constitute 85% of the views that the video will receive in its lifetime).

System 100 then estimates where a given video is on the curve (based on its age), and how many monthly views can be expected of that video to produce over its lifetime. Based on the video's position on the curve, system 100 estimate how many views will occur monthly as a proportion to its lifetime total views (based on the first 30 days). The curve is primarily used to value back catalog content as system 100 predicts that it will capture the full revenue streams of future content (discussed below), The curve is used to estimate how much of the revenue of a back catalog item can be expected to be captured.

As can be seen in FIG. 2, there is a separate set of steps undertaken such that content and creators can be classified in furtherance of determining a valuation for the content catalog. At step 950, creators known to system 100 are continually classified by the type of content they have produced, the number of subscribers attributable to the creator, the revenues derived by the creator over various time periods as well as other metrics. Example content type classifications include:

Education/Learning
How-to guides
Gaming
Lifestyle
Music
Movies
News
Sports
Fashion and Beauty
Finance and investing
Business
Entrepreneurship
TV Series
Streaming
Self-help/improvement These classifications (type of content, number of subscribers, revenues derived and others) are stored in content classification database 910 and are continually updated as new content creators and their attributes become known to system 100 over time. So, for example, database 910 may maintain records as follows:

| Classification | Number Meeting | Discount/Growth Rates |
|---|---|---|
| Revenue >100 K per year | 49 | D = 15%; G = 7% |
| Subscribers >500 but <5000 | 22 | D = 20%, G = 15% |
| Content type = Swimsuit model influencer videos | 134 | D = 20%; G = 7% |
| Revenue >5 K per month AND Content type = Food Preparation Videos | 31 | D = 10%; G = 7% |

As new content catalogs and content creators associated therewith are submitted for valuation or otherwise become known to system 100, new classifications and additional quantities of catalogs/creators falling into that that classification are added. Aggregation of these classifications and frequencies for each is accomplished at step 952. Then, at step 954, discount and growth rates can be adjusted for each classification based on an iterative process of learning how these rates should be adjusted based on actual performance of specific classifications over time (e.g. how much revenue content falling into a specific classification actually performs over time). At step 954, these rates (which are periodically updated and adjusting via machine learning) can be applied and used in connection with the overall process at step 112.

At step 112, system 100 in general, and valuation 310 in particular, determines expected views for each content component in the content catalog. In preferred embodiments of the present invention, this is determined by considering the age of each content component along with the discount and growth rates associated with the classifications for each respective content component. Overall expected views is then calculated by summing expected views for all content components comprising the catalog to generate a total expected views value.

Next, at step 114, historical content revenue for the appropriate classifications is retrieved by valuation engine 310 from historical revenue metrics database 390 and combined with user average revenue. This value is then multiplied by the total expected views value generated in step 112. In preferred embodiments, each creator will have an average RPM (Revenue Per Mille) based on all the revenue they have accrued divided by all the views they have accrued. This forms the basis of the cash flow estimate. With that in mind, system 100 considers that some individual videos may generate more or less revenue on an RPM basis than others. In order to accommodate this, system 100 preferably uses a combination of RPM values to form the basis of the monthly revenue calculation. For example:

Assume a video has an RPM of 0.02 and the affiliated creator has an RPM of 0.03 and the video is expected to produce 1,000,000 views during the lifetime of the time that revenue is assigned to the investors:

$$\text{Estimated lifetime revenue} = \text{estimated lifetime views} * (\text{estimated RPM}/1000) \quad 1)$$

$$\text{Estimated RPM} = (0.7 \text{ (or some proportion } x \text{, based on data)} * \text{Creator RPM} + (0.3 \text{ (or } 1-x) * \text{Video RPM}) \quad 2)$$

At step 116, individual content component revenue streams are forecasted with respect to the stated contract life. Revenue streams are forecasted by taking the total lifetime views to date, placing the content on the view proportion curve as described above and then multiplying the monthly views (as a proportion of first 30 days views) for each future month in the contract by the estimated RPM as described above. In preferred embodiments of the present invention, content catalogs which are to be securitized are valued based on a limited timeframe applying to the revenue streams. In other words, in such embodiments, creators agree to offer revenues generated from content catalogs for a limited period of time such as 1 year or some multi-year period. Following that period, title to the content catalog as well as rights to receive the revenue streams flowing therefrom revert back to the creator. The length of time prior to reversion is determined and agreed to by the creator and reflected in the contract under which securitization will take place.

At step 118, the revenue streams determined at step 116 and may be discounted by a fixed rate and/or a fixed growth rate may also be applied as determined by the classification of the content catalog. All monthly revenues are next summed up. Each month's expected revenue may then be discounted by both a profit amount and a time value amount. System 100 may use views as a proxy for revenue, and crow views based on expectations of a content platform's overall growth, as well as the growth for the individual creator based on classification (type of content, current size, etc). System 100 may also decay views at an individual content component level at the same time to take into account the fact that net new views on older content decreases over time.

Using the table above for example, the growth rates represented may reflect classes as follows:

Row 1 (D=15; G=7)—represents typical content class; can be used as a default.
Row 2 (D=20; G=15)—represents higher risk content so higher discount, but higher expected growth.
Row 3 (D=20; G=7)—represents high risk content with little growth expected.
Row 4 (D=10; G=7)—represents perennial content so low risk (lower discount) and average growth.

Next, at step 120, each revenue stream is discounted by a time based rate. The revenue streams are discounted by a time-based rate to account for the time value of money. Essentially, this is the risk adjusted return for investing in this asset for the life of the contract vs. buying a similar duration treasury bill. For example, assume the 5-year treasury bill pays 5% per year. Because this is a risky cash flow (it is unknown how much will be paid out), system 100 adds a risk premium to this, say another 5%. This means that system 100 may value the cash flow as if it is compounding at 10% annually. System 100 therefore breaks down the cash flows by month and applies this rate to them on a monthly, quarterly or yearly basis.

By Way of Example:

Assume a content component is expected to have revenue of $1,000 this month and $500 in one year. This will be valued at the sum of $1,000 (no time has passed) for this month's revenue and ~$450 for the revenue in one year ($508*(1−0.1)=$1,450 applying a discount rate of 0.1.

Finally, at steps 122 and 124, all expected revenue streams are summed and a total amount is determined as a valuation. Taking into account all of the above, views are forecasted. This works similarly for back catalog and future content (future content catalogs are discussed below), but since the most valuable beginning portion of the revenues for future content are captured, system 100 doesn't take into account where future content would lie on the view proportion curve.

In connection with the valuation of a back catalog according to the teachings of the present invention:

i. First, the curve is generated;
ii. Each individual content component is placed on the curve to estimate how many views are expected to be received each month for the life of the contract based on the first 30 days views (could be modified to be an arbitrary number);
iii. The expected views are then grown over the life of the contract by the growth rate;
iv. The views of each content component are also decayed over the life of the contract based on the decay rate;
v. Each content component then has the estimated monthly views multiplied by some combination of (Creator Average RPM)*(Video RPM). This provides the video's monthly revenue;
vi. This is done for each video for each month in the contract. This provides monthly cash flow;
vii. The cash flow is then discounted by the profit rate;
viii. This cash flow is then discounted by the TVM (time value of money) (which gets higher further into the contract); and
ix. The cash flows for all the months are then summed to give the upfront cash payment.

Figure 3:
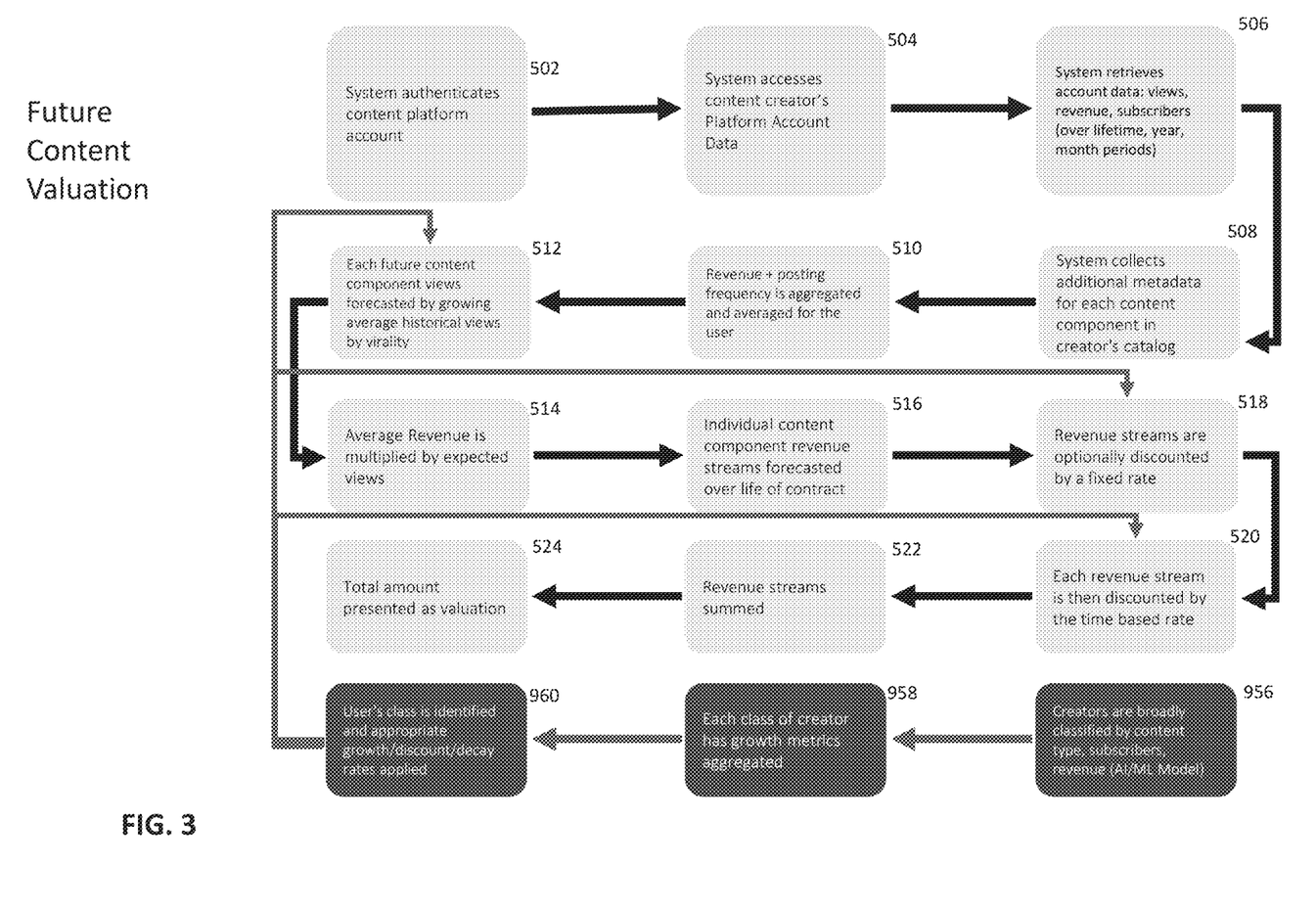
FIG. 3 is a process flow diagram illustrating the process for automatic future content valuation in one embodiment of the present invention.

With reference now to FIG. 3, the process for valuation of a future content catalog by valuation engine 310, in preferred embodiments is next described. In this case; rather than valuing a content catalog with existing content components, bounds are set regarding a content catalog to be developed in the future. Bounds may include a specific creator, a specific type of content, a specific content platform where the content is created and/or hosted as well as other metrics. So, for example, a future content catalog may be specified, by contract for securitization, to be:

ALL FASHION VIDEOS DEVELOPED BY SUSAN JONES DURING THE PERIOD FROM Jan. 1, 2023 TO Dec. 31, 2025 AND HOSTED ON THE YOUTUBE CONTENT PLATFORM

In some embodiments, the contract may require the content creator to produce a certain minimum set of content components during the overall time period and/or at specific intervals during the time period.

As with the valuation process for a back catalog, the process for valuing a future content catalog may be invoked at any time a valuation of such a catalog is desired or required. For example, it may be invoked in connection with the overall process required to initiate an initial offering of one or more future content catalogs. Alternatively, it may be invoked later, in connection with secondary trading of a securitized catalog. In either case, the novel valuation methodology of the present invention provides unique advantages in support of investing and trading of content catalog revenue streams.

The process of obtaining an automated valuation of a future content catalog begins at step 502 wherein valuation engine 310 of system 100 authenticates a content creator's account information on content platform 200 via accounting module 202. This is preferably achieved as a result of communication between system 100 and content platform 200 using available APIs. In preferred embodiments, a content creator will provide required account information associated with the account holding the content catalog as well as all authorization information such as required passwords such that a protocol is established wherein valuation engine 310 can query content platform 200 for data required in connection with later steps in the process.

While this process is discussed in the context of a content creator account and one or more future content catalogs associated with that content creator on the specific content platform 200, other alternatives are possible. For example, the process can take place with respect to a single future content catalog associated with an account or a single account holding content from various content creators. There exist many different possibilities with the only requirement being that there is account information associated with one or more pieces of content available on content platform 200.

At step 504, system 100, now that it has been authorized by content platform 200, accesses platform account data resident on content platform 200 and associated with the account which has been authorized. This data may include, as referenced in step 506, for example, number of views for a specific grouping of content, revenue generated from a specific grouping of content, number of subscribers to a specific grouping of content over a lifetime (or some specified time period such as the last year, last month etc.) as well as other data which is useful in generating a valuation for a future content catalog according to the teachings of the present invention in a preferred embodiment thereof.

At step 508, data for each content component in creator's current catalog is retrieved until data is obtained for all content components in the content creator's current catalog. At step 510, revenue and posting frequency is aggregated and averaged for the user. For a given creator, they may post x times per month. This is used to assume how many times they should post for their future content. Say they post 50 times per year, system 100 uses this number to create a valuation for 50 posts per year. This would work out to 4 per month. The revenue for each content component is then multiplied by the monthly post frequency for each month of the contract and then discounted as described above.

As can be seen in FIG. 3, and similar to what is undertaken in accordance with back catalog valuation according to the teachings of the present invention, there is a separate set of steps undertaken such that content and creators can be classified in furtherance of determining a valuation for the future content catalog. At step 956, creators known to system 100 are continually classified by the type of content they have produced, the number of subscribers attributable to the creator, the revenues derived by the creator over various time periods as well as other metrics. These classifications are stored in content classification database 910 and are continually updated as new content creators and their attributes become known to system 100 over time. As new content catalogs and content creators associated therewith are submitted for valuation or otherwise become known to system 100, new classifications and additional quantities of catalogs/creators falling into that that classification are added. Aggregation of these classifications and frequencies for each is accomplished at step 958. Then, at step 960, discount and growth rates can be adjusted for each classification based on an iterative process of learning how these rates should be adjusted based on actual performance of specific classifications over time (e.g. how much revenue content falling into a specific classification actually performs over time). At step 960, these rates (which are periodically updated and adjusting via machine learning) can be applied and used in connection with the overall process at step 512.

At step 512, system 100 in general, and valuation 310 in particular, determines expected views for each future content component in the content catalog. In preferred embodiments of the present invention, this is determined by growing average historical views by virality. In preferred embodiments, system 100 takes into account if content that has been posted is viral vs evergreen.

a. Viral content has very high initial views but then low ongoing views. (e.g. reaction video to new music video)

b. Evergreen content has some number of initial views, but then more consistent ongoing views. (e.g., Instruction video on how to make espresso.)

c. System 100 does this by using the view proportion curve as described above. System may also take into account classification data which is obtained from content classification database 910.

d. More viral content has viewership decayed at a higher rate over time for back catalog valuations.

Next, at step 514, average revenue is multiplied by expected views. At step 516, individual content component revenue streams are forecasted with respect to the stated contract life. In preferred embodiments of the present invention content catalogs which are to be securitized are valued based on a limited timeframe applying to the revenue streams. In other words, in such embodiments, creators agree to offer revenues generated from content catalogs for a limited period of time such as 1 year or some multi-year period. Following that period, title to the content catalog as well as rights to receive the revenue streams flowing therefrom revert back to the creator. The length of time prior to reversion is determined and agreed to by the creator and reflected in the contract under which securitization will take place.

At step 518, the revenue streams determined at step 516 may be discounted by a fixed rate as determined by the classification of the content catalog. Next, at step 520, each revenue stream is discounted by a time-based rate. Finally, at steps 522 and 524, all expected revenue streams are summed, and a total amount is determined as a valuation.

Figure 4A:
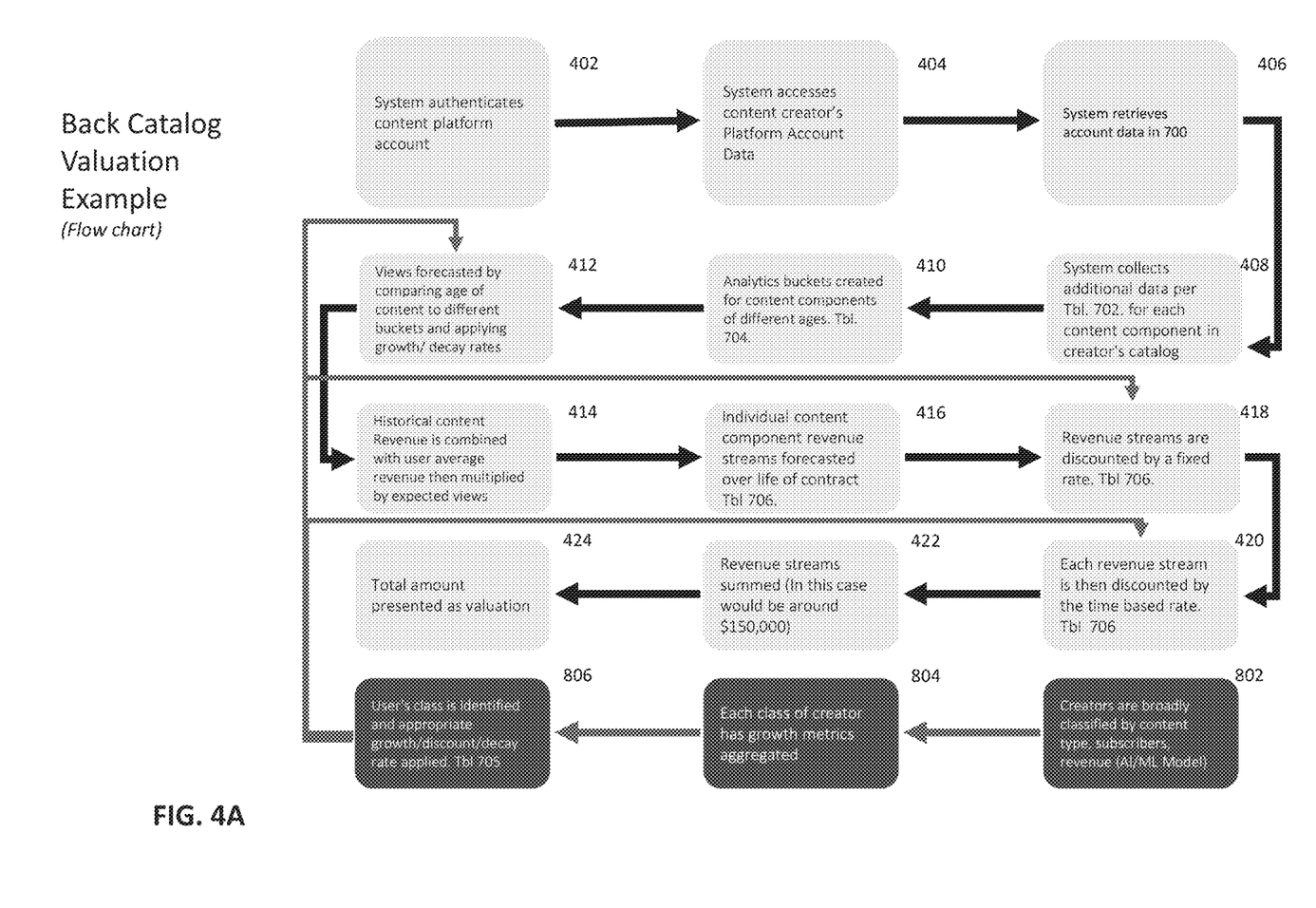
FIG. 4a depicts exemplary data which is used in connection with the valuation process of the present invention in preferred embodiments thereof.
Figure 4B:
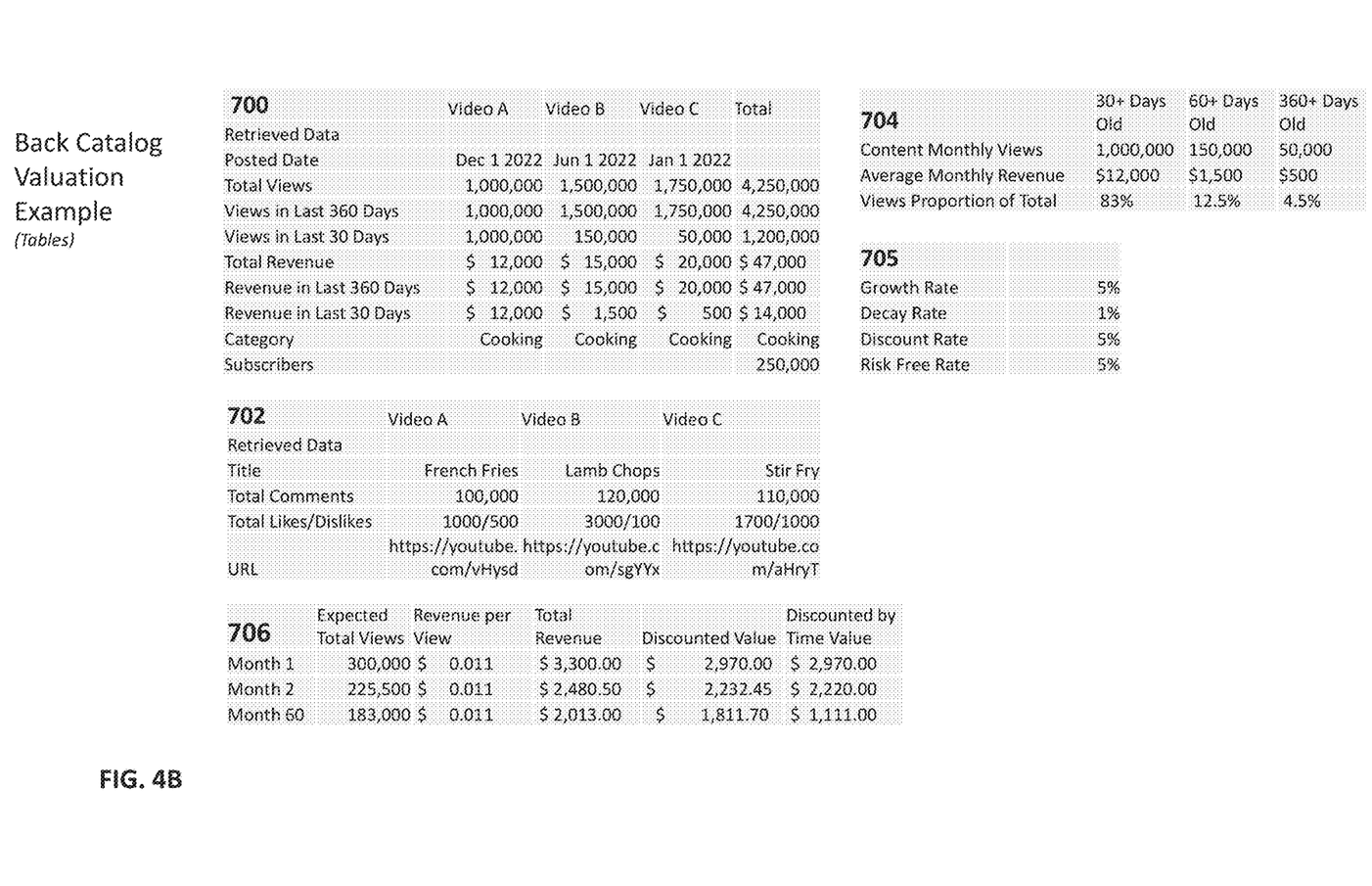
FIG. 4b is process flow diagram illustrating the process for automatic back-catalog content valuation using the exemplary data in FIG. 4a. in one embodiment of the present invention.

Now with reference to FIGS. 4a and 4b, exemplary back catalog data is provided along with a description of how valuation of that catalog may proceed according to the teachings of the present invention in preferred embodiments thereof.

At step 402 (see FIG. 4b), a creator authenticates in system 100 and authorizes the platform to retrieve data from the content platform 200. Then at step 404, system 100 accesses the content platform 200 and in step 406 retrieves various data including but not limited to those listed in table 700. Then at step 408, for each content component, system 100 retrieves additional metadata including but not limited to those in table 702. In this example the catalog consists of only three videos that were posted throughout the past year.

At step 410, system 100 creates the view proportion curve for the creator. System 100 compares the views of every content component (i.e. each video) in the last 30 days to its lifetime views. This data is then aggregated to get a proportion of views that can be expected for an arbitrary month based on the age of the content. In this example, the class of the content creates the assumption that views will initially spike in the first 30 days, then decay into a steady stream of views. In this example, in table 704, the content that is 360+ days old has 50,000 views per month.

Separately, system 100 continuously collects data about creators and classifies them according to different criteria such as total views, creator age, content category, total subscribers etc. in steps 802 and 804. Each classification is assigned a growth rate as well as a decay rate. Broadly speaking, content that is predicted to have long term appeal will have a lower decay rate, and creator classes that are expected to see an increase in popularity will have a greater growth rate.

In step 806, the class of the creator is identified using the data collected in steps 406 and 408, and the pre-determined growth, discount, decay rates and other relevant inputs are applied to the creator.

In step 412, system 100 forecasts the monthly views of each content item, Essentially, it is assumed that content of the same creator and same class will behave similarly. In this example and referencing the curve shown in table 704, video A, having accrued 1,000,000 views in month one will have accrued 83.3% of its short-term views. Month two should account for 12.5% of the short-term views, decaying to 4.5% of the views in month twelve and in this case around 4.5% of those views every month for the longer term. The expectation is that the latter part of the curve will constitute a fair estimate of the long-term recurring views that the content will accrue. This long-term monthly view amount is grown by the expected growth rate and decayed by the expected decay rate.

In step 414, system 100 then calculates the average revenue that the content component will produce per view (RPM/1000). For example for Video A, it produced $12,000 for 1,000,000 views. This would be a Revenue Per Mille of $12 or Revenue Per View of $0.012. This is then combined with the creator's overall Revenue Per View, calculated by taking the creator's total revenue divided by their total views, as described earlier. The Revenue Per View is then multiplied by the expected monthly views.

In step 416, system 100 forecasts every month's revenues in the contract, shown in condensed form in table 706. Step 418 is where system 100 can then optionally discount the revenue by a fixed amount determined in step 806.

Following this, in step 420, system 100 discounts each individual monthly revenue amount by a time-based rate determined in step 806. This rate necessarily increases towards the end of the contract to account for investing in a risky asset. If we imagine an investor who can otherwise invest their money in a different lower risk investment, they'll expect higher returns for a higher risk investment. The cash flows close to the present are not discounted very much, and the cash flows far in the future are discounted more aggressively. In step 422, system 100 sums up all the monthly discounted cash flows to arrive at a value that is presented in step 424.

Figure 5:
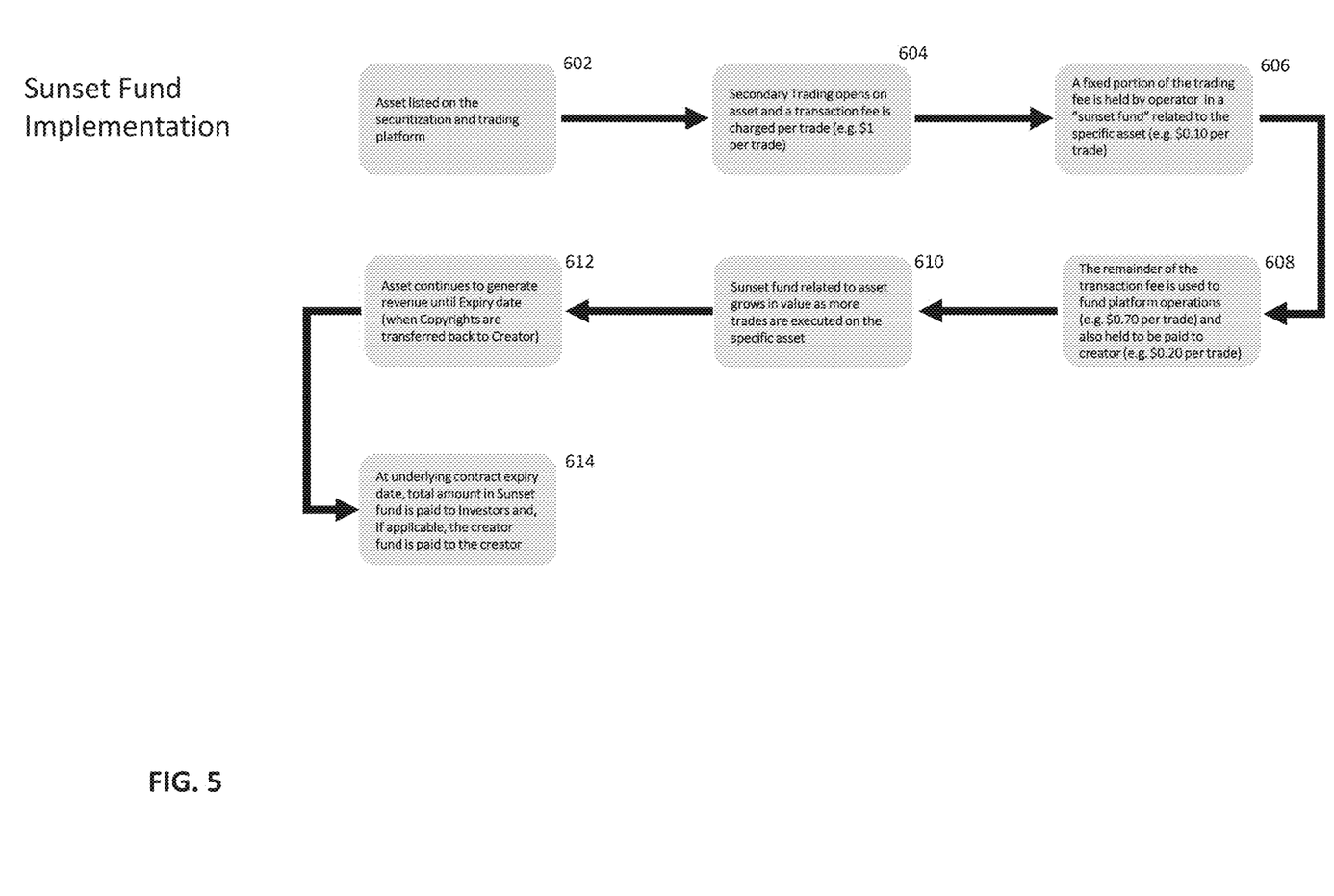
FIG. 5 is a process flow diagram illustrating the process for implementing a sunset fund associated with a content catalog in one embodiment of the present invention.

Now, with reference to FIG. 5, a discussion of the novel aspect of a Sunset Fund in accordance with the teachings of the present invention is now provided. The Sunset fund is a unique and novel aspect of the present invention that addresses the issue of the value of time-limited securitized content diminishing over time as revenue streams are paid out to the investors. For example, if a securitized content catalog is expected to generate $1 million over the life of the contract (e.g. five years), then as shares of the derived revenue streams are paid out to investors, for example, each month, the value of the underlying securitized content catalog (the value of which is in the revenue streams generated) will necessarily decrease as each month passes.

As a result, the underlying share value associated with each share of the securitized catalog will also decrease and this will hinder both secondary trading and possibly investor confidence. The unique process in which a Sunset Fund is set up and deployed by system 100, and in particular sunset fund implementation module 350, mitigates these negative impacts.

According to the teachings of the present invention, a sunset fund may be created with respect to each securitized content catalog in accordance with the steps now discussed in connection with FIG. 5. Beginning at step 602, the catalog is listed on system 100. At step 604, secondary trading opens with respect to that catalog allowing investors to buy and sell shares representing an interest in the catalog and the revenue streams derived therefrom. In connection with trades between buyers and sellers, a transaction fee is charged to buyers and/or sellers each time a transaction with respect to the specific catalog is made. For example, buyer may pay ½ of a $1 transaction fee ($0.50) and seller may pay the other half. Other divisions or schemes for the imposition of fees are possible while still remaining in the scope and spirit of the present invention.

At steps 606 and 608, sunset fund implementation module operates to divide the trading fee between and among various different "buckets". One bucket may be retained by the operator of system 100. Another bucket may be created to be paid to the content creator and a third bucked may be created to be placed in the sunset fund associated with the catalog. So, for example, of a $1 trading fee for a trade, $0.10 may go into the "sunset fund", $0.70 may go to the platform operator, and $0.20 may go into a bucket to be paid to creator. Of course, various other divisions are possible.

At step 610 and as additional secondary trades are made with respect to the catalog, the sunset fund will grow in value. At step 612, it is assumed that the time period for the securitized asset has expired and the time period for the contract (and the right to future revenue streams) has expired. At step 614, and upon such expiration, the sunset fund is paid to the investors holding shares as of the expiration. The division of the sunset fund between and among such investors is preferably done pro-rata although other methodologies for sharing the fund may be used. Similarly, upon expiration at step 614, if a content creator bucket has been created, those funds can be disbursed to the content creator and/or his or her designee.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims.

What is claimed is:

1. A computing system for transforming content catalog data associated with a predetermined content catalog containing one or more content components to generate a valuation associated with said predetermined content catalog, the computing system comprising:
   one or more processors; and
   one or more memories storing instructions that, when executed by the one or more processors, cause the computing system to perform a process comprising:
      receiving said content catalog data from at least one source of content catalog data;
      assigning each of said content components, wherein each of said content components is a video, to an analytics bucket;
      generating at least one growth or decay rate to be associated with said analytics bucket;
      iteratively modifying said growth and decay rates based upon historical revenue metrics;

applying said modified growth and decay rates to each of said content components based upon the analytics bucket to which said content component is assigned to determine an adjusted intermediate value for each said content component;

generating, with respect to each said content component, an expected cash flow forecast value based upon at least expected views for each said content component over a predetermined time period corresponding to said valuation associated with said content catalog and the adjusted intermediate value determined for each said content component;

summing all expected cash flow values for the aggregate set of content components contained within said content catalog, to generate said valuation associated with said content catalog;

transmitting said valuation to at least one client computer;

securitizing, based on said valuation, a limited timeframe revenue stream of said predetermined content catalog; and initiating secondary trading of securitized shares of said predetermined content catalog in response to a value of time-limited securitized shares of said predetermined content catalog diminishing over time as corresponding revenue streams are paid out, and remaining funds from said secondary trading are retained after payment to said creator and paid out to investors in said predetermined content catalog when revenue streams associated with said predetermined content catalog cease, wherein
said predetermined content catalog is (a) an existing content catalog comprising said one or more content components as created by a content creator or (b) a content catalog expected to include said one or more content components as created by said content creator in the future.

2. The system of claim 1 further comprising a historical revenue metrics database containing historical revenue metrics which are iteratively applied to adjust either or both of said decay or growth rates associated with each said analytics bucket.

3. The system of claim 1 wherein said at least one source of content catalog data comprises a content hosting platform.

4. The system of claim 1 further comprising a content classification database containing content classification data which is iteratively applied to adjust either or both of said decay or growth rates associated with each said analytics bucket.

5. The system of claim 4 wherein said content classification data comprises data associated with one or more content development attributes associated with said content creator.

6. A method of determining a valuation for a predetermined content catalog, the method being implemented in a computer system comprising one or more processors and the method comprising:

receiving content catalog data, said content catalog data comprising identifying information associated with content components contained within said predetermined content catalog;

generating a set of analytics buckets, each of said analytics buckets associated with one or more attributes exhibited by said content components;

assigning each of said content components, wherein each of said content components is a video, to one of said analytics buckets;

generating at least one growth or decay rate to be associated with each of said analytics buckets;

iteratively modifying said growth and decay rates based upon historical revenue metrics;

applying said modified growth and decay rates to each of said content components based upon the analytics bucket to which said content component is assigned to determine an adjusted intermediate value for each said content component;

generating expected cash flow values for each of said content components, based at least upon expected views for each said content component over a predetermined time period corresponding to said valuation for said content catalog and the adjusted intermediate value determined for each said content component;

summing all expected cash flow values for all of said content components to determine said valuation for said content catalog;

transmitting said valuation to at least one client computer;

securitizing, based on said valuation, a limited timeframe revenue stream of said predetermined content catalog; and initiating secondary trading of securitized shares of said predetermined content catalog in response to a value of time-limited securitized shares of said predetermined content catalog diminishing over time as corresponding revenue streams are paid out, and remaining funds from said secondary trading are retained after payment to said creator and paid out to investors in said predetermined content catalog when revenue streams associated with said predetermined content catalog cease, wherein
said predetermined content catalog is (a) an existing content catalog comprising said one or more content components as created by a content creator or (b) a content catalog expected to include said one or more content components as created by said content creator in the future.

* * * * *